Nov. 7, 1967   G. A. ARMANTROUT ETAL   3,351,758
WINDOWLESS HIGH-RESOLUTION SOLID STATE RADIATION DETECTOR
Filed April 15, 1965

INVENTORS
DAVID C. CAMP
GUY A. ARMANTROUT
BY
ATTORNEY

INVENTORS
DAVID C. CAMP
GUY A. ARMANTROUT
BY
ATTORNEY

United States Patent Office 3,351,758
Patented Nov. 7, 1967

3,351,758
WINDOWLESS HIGH-RESOLUTION SOLID
STATE RADIATION DETECTOR
Guy A. Armantrout and David C. Camp, Livermore,
Calif., assignors to the United States of America as
represented by the United States Atomic Energy
Commission
Filed Apr. 15, 1965, Ser. No. 448,548
6 Claims. (Cl. 250—83.3)

ABSTRACT OF THE DISCLOSURE

A sensitive radiation detector is disclosed herein having an intrinsic semiconductor region separating positive and negative type impurity doped regions, wherein the intrinsic zone is of a thickness heretofore unobtainable, thus providing lower capacitance and a substantially larger radiation collection area. In particular, an impurity of the negative polarity type is diffused into one of the smaller ends of an elongated germanium semiconductor crystal which has previously been doped with an impurity of the positive polarity type. After this diffusion operation, the negative impurity is then drifted in a longitudinal direction of the wafer for a substantial time period to render a major portion of the wafer body intrinsic. This intrinsic volume is subtended by a larger surface portion of the wafer, thereby permitting great amounts of radiation to be received by the intrinsic zone from directions generally perpendicular to the longitudinal direction of the semiconductor body. Furthermore, the unusually thick intrinsic semiconductor zones obtained by drifting an impurity along the longitudinal axis of the wafer body provide substantial separation between the negative and positive impurity concentrations located on opposing ends of the detector, thus permitting extremely low capacitance therebetween, e.g., on the order of 2 picofarads.

The present invention relates to solid state radiation detectors. More particularly, it relates to a solid state radiation detector of a new construction which imparts to the detector an exceedingly high energy resolution characteristic.

Solid state devices have becom an important tool in the nuclear science field, particularly in the area of investigations of radiations from the natural and artificial radionuclides. Radiation is defined herein to include charged and uncharged particles such as alphas, betas or electrons, protons and neutrons, and gamma rays. However, since solids state detectors are capable of detecting ion and neutral atomic particles, when the term radiation is used herein, it will be understood to include such atomic particles unless specified otherwise.

By observing and analyzing radiation emitted during radioactive transformations, it is possible to identify and classify the energy levels of the nucleus of various atoms as well as to identify the atomic species. A spectrum of the energy levels of a particular atomic nucleus is a very important source of information about the structure of the nucleus. The quality of such information depends to a large extent on the precision with which the radiactive changes of a given nucleus is measured. For example, in some radioactive transformations, a particular type of radiation is emitted at two discreet but nearly identical energies. To obtain accurate data about the character of the energy levels of the nucleus, it is necessary that the radiation detector be able to unequivocally discriminate between the radiations of different energy levels.

Although there are many types of apparatus that may be used in radiation detection, e.g., gas, scintillator and solid state detectors, solid state devices have become very important radiation detectors, especially in nuclear spectroscopy. Solid state detectors have become important in such applications because of their superior energy resolution characteristic. The energy resolution capability of solid state detectors can be at least one order of magnitude better than gas detectors and two orders of magnitude better than scintillator detectors. However, prior art solid state radiation detectors also have recognized limitations which if eliminated would significantly enhance their value as radiation detectors. The most significant of these limitations are the restricted energy resolution characteristic and inexactness of the detector's output signal as a representation of the energy level of the radiation under observation.

All of the noted limitations find their origin in the particular construction of the prior art solid state radiation detectors. Such detectors are generally constructed from a selectively doped semiconductor crystal in the form of a wafer defining perpendicularly intersecting cross sectional planes of maximum and minimum areas. A selected impurity is diffused and drifted into the crystal from a crystal surface of maximum area to form a PN junction. In order that the detector may be electrically connected to the required electrical circuitry, opposite surfaces of the detector in respective planes transverse to the drift axis are provided with ohmic contacts in the form of a conductive film masking the opposite surfaces to which the electrical connections are made. The semiconductor crystal is activated to be responsive to incident radiation by applying a reverse bias voltage to the crystal between the conductive film masked surfaces of a magnitude productive to form a region depleted of charge carriers.

The solid state detector's output is generally coupled to a preamplifier system. Because of the inherent system noise, the energy resolving ability of the system is degraded. By reducing the characteristic capacitance of the solid state detectors, the energy resolution of the system can be improved. The characteristic capacitance of a given solid state detector is defined by the equation $$C = \epsilon \frac{A}{d}$$

where $d$ is the distance in meters between the surfaces between which current flow is established, $A$ is the cross sectional area in square meters of the semiconductor crystal in a plane transverse to the path of current flow, $\epsilon$ is the permitivity of the semiconductor material in farads per meter, and $C$ is the characteristic capacitance of the semiconductor in farads.

From the above equation, it is seen that the capacitance can be reduced, hence energy resolution improved, by either decreasing $A$ or increasing $d$. However, to insure that the detector effectively intercepts the radiation under observation, it is necessary that the detector present to the impinging radiation a facing surface area of at least a few square centimeters in dimension. In the prior art wafer solid state detectors, the area $A$ is the area of that surface which is in facing relationship to the impinging radiation and which a metal film masks. Further, the radation incident surface of area $A$ is the surface of the detectors having the maximum area. Hence, in prior art detectors, the area controlling its characteristic capacitance has a practical lower limit of a few square centimeters. In view of this area limitation, attempts to improve the energy resolution capability of solid state detectors have been directed towards increasing the distance $d$ between the metal film surfaces thereof by, for example, increasing the depletion depth of the detector. However, at present the minimum characteristic capacitance attained has been on the order of tens of picofarads. This is still too excessive to attain best resolution for reasonable incident surface areas.

Another undesirable feature characteristic of prior art solid state radiation detectors is the masking with a conductive film of the detector's surface through which the radiation to be detected enters into the interior of the semiconductor. The conductive film adsorbs some of the energy of charged particle radiation as it passes therethrough prior to its encountering the semiconductor material. Hence the detector's output signal is in all circumstances an inexact representation of the energy level of the radiation under observation. Furthermore, in some cases where the penetrating power of the radiation is small, e.g., low-energy gamma and beta rays, the film may adsorb essentially all of the radiation. In such cases the detector would be useless.

Considerable advantage is therefore to be gained by the provision of a solid state detector having a smaller characteristic capacitance than available in the prior art, and a non-preattenuating surface exposed to the incident radiation under observation.

The present invention provides a solid state radiation detector featuring a characteristic capacitance on the order of one picofarad. The detector of the present invention includes the additional feature of a non-preatenuating surface on to which the radiation under observation impinges. With these features, the radiation detector of the present invention overcomes those before-mentioned limitations and disadvantages characterizing the prior art detectors. More particularly, the radiation detector of the present invention comprises a body of semiconductor material having a greater length dimension relative to width and thickness dimensions. The elongated semi-conductor body defines a maximum unobstructed surface area along its length for impingement thereon of the radiation under observation. The semiconductor material is, doped with first and second electrical conductivity affectuating impurities of opposite polarities to define a PN junction which is transverse to the body's maximum surface area.

In use, a reverse bias voltage is applied to the semiconductor at opposing surfaces of lesser area than and angularly disposed to the surface upon which the radiation under observation impinges. This bias voltage forms a zone extending from either side of the PN junction which is depleted of charge carriers, i.e., electrons and holes. Such depleted zone will be designated hereinafter as an intrinsic zone. The semiconductor is positioned to receive radiation under observation upon its maximum surface area. As the radiation penetrates to the interior of the semiconductor, the radiation energy is converted to electron-hole pairs. The number of electron-hole pairs produced is proportional to the energy level of the particles of the incident radiation and/or to the flux level in the case of intense fluxes. The generated electron-hole pairs drift to the P and N zones respectively of the semiconductor to form a current pulse which is a representation of the energy and/or intensity of the incident radiation.

Accordingly, it is an object of the present invention to provide a highly radiation sensitive solid state radiation detector.

More particularly it is an objecion of the present invention to provide a high energy resolution solid state radiation detector.

Yet a further object of the present invention is to provide a solid state radiation detector lacking a preattenuating incident radiation surface.

It is an additional object of the present invention to provide a versatile solid state radiation detector capable of detecting radiation of both low and high penetrating power properties.

It is a particular object of the present invention to provide a solid state radiation detector suitable for detecting both beta radiation and low-energy gamma radiation.

The manner of achieving these and other objects and advantages will be set forth in more particularity in the following detailed description considered together with the accompanying drawings in which:

FIGURE 1 is an illustration of a rectangular cubical diode embodiment of the high resolution solid state radiation detector of the present invention.

FIGURE 3 is cross sectional review illustrating the solid state detector of FIGURE 1 mounted to detect radiation.

Figure 2:
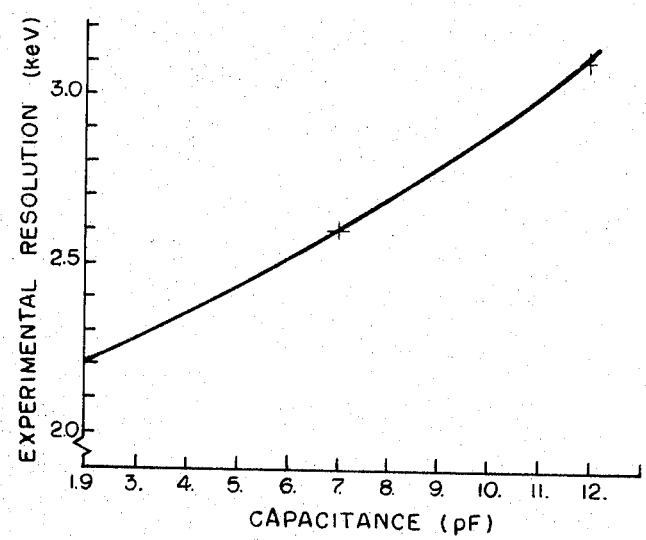
FIGURE 2 is graphical representation of the variation of the energy resolution as a function of the capacitance of the solid state radiation detector of FIGURE 1 electrically connected to the input of a preamplifier system.

Considering now the solid state radiation detector of the present invention in detail with reference to FIGURE 1, a body of semiconductor material 11 is provided having a greater length dimension 12 relative to width 13 and thickness 14 dimensions. As illustrated in FIGURE 1, one embodiment contemplated is a semiconductor body 11 having an elongated rectangular cubical configuration with length 12 and one of the lesser dimensions, width 13 in the embodiment of FIGURE 1, defining a surface 16 of maximum area. In accordance with the present invention, it is intended that in use the semiconductor body 11 be mounted to receive the radiation to be observed on its maximum area surface 16.

To provide a PN junction zone for the detection of radiation, a first electrical conducting affectuating doping impurity of a selected polarity is incorporated in the semiconductor body 11 in a first zone 17 terminating at a surface 18 of lesser area than and angularly disposed to the maximum area surface 16. As shown in FIGURE 1, surface 18 is defined by length 12 and thickness 14 dimensions, and perpendicularly intersects surface 16. Furthermore, preferably zone 17 is rectangular extending throughout the semiconductor body material to a finite depth along width 13 generally on the order of a few tenths of a centimeter, i.e., millimeters, generally less than about 1 centimeter, but more than about 1 millimeter.

The PN junction is formed by incorporating a second electrical conducting affectuating doping impurity of a polarity opposite to the first doping impurity in body 11 in a second zone 19 disposed opposite zone 17. In the embodiment illustrated in FIGURE 1, zone 19 is rectangular extending from a surface 21 throughout the semiconductor body material at least to a selected finite depth along width 13 terminating at a boundary 22.

In one embodiment, it is contemplated that the solid state radiation detector of the present invention be prepared from an elongated wafer-like body 11 of semiconductor material, for example intrinsic germanium, doped substantially throughout with a positive type impurity, such as gallium, to have a resistivity of approximately 40 ohm-centimeters. The PN junction is formed by coating a negative type impurity, e.g., lithium, on surface 18 and diffusing the lithium into the doped semiconductor body 11 along width 13 to a depth defined by boundary 23 of tenths of a millimeter, e.g., 0.1+00.9 mm. Although not shown, at this stage of the preparation of the solid state radiation detector, zone 19 extends from surface 21 to boundary 23, hence boundary 22 actually being coincident with boundary 23.

The solid state radiation detector is placed in its final form by drifting the lithium impurity from zone 17 into the doped body 11 while applying a reverse bias voltage to body 11 between zones 17 and 19 to form a zone 24 depleted of all free charge carriers, hence, being intrinsic. The interior extremities of intrinsic zone 24 are defined by boundaries 23 and 22, with zone 24 separating the negative zone 17 from positive zone 19.

Alternatively, the radiation detector semiconductor material of the present invention is fabricated by diffusing a positive type impurity into one end of an intrinsic semiconductor body 11 to form the positive zone 19. Similarly, a negative type impurity is diffused into the end of body 11 opposite zone 19 to form the negative zone 17 separated from zone 19 by intrinsic zone 24.

In either of the above-noted fabricated embodiments, a solid state radiation detector is provided which comprises the body of semiconductor material 11 having the N-type zone 17 separated from the P-type zone 19 by the radiation sensitive intrinsic zone 24 which is depleted of free electrons and holes. The depleted zone 24 responds to radiation penetrating thereing by converting the energy and intensity of the penetrating radiation to a correlated and proportional number of electron-hole pairs. By impressing a reverse bias voltage between N-type and P-type zones 17 and 19 respectively, an electrostatic field is established across the depleted zone 24 which forms the electrons and holes generated therein into a current which is representative of the energy and/or intensity of the impinging radiation. More particularly, output current pulses may be produced having a voltage proportional to the energy of an incident particle suitable for use with multichannel pulse height analyzers or a current pulse which is representative of pulsed particles or gamma or X-ray fluxes suitable for display on an oscilloscope, etc.

To provide the means of electrically connecting the necessary electronic circuit components to the semiconductor body 11, surface 18 is masked with a conductive film 26. In those cases where the depth of zone 19 is small, i.e., on the order of a few millimeters, its surface 21 is similarly masked with a conductive film (not shown). Film 26 may be selected from any conductive material, e.g., indium, 50 percent indium–50 percent gallium alloy, aluminum, capable of forming an ohmic contact with a semiconductor material. However, where body 11 is a doped germanium semiconductor material, it is preferred that the film 26 be selected from materials that are conductive at cryogenic temperatures, e.g., indium-gallium alloy or pure indium. This is preferred because in operation, the germanium body 11 is often maintained at cryogenic temperatures in order to keep the solid state radiation detector's leakage or noise current low. On the other hand, if body 11 is comprised of a doped silicon semiconductor material, the solid state radiation detector can be operated at room temperature. Hence, the limitations on the selection of the material for film 26 due to cryogenic considerations is eliminated.

In an embodiment actually constructed and operated, the gallium doped germanium semiconductor body 11 had a length dimension 12 of 3 centimeters, a width dimension 13 of about 1.35 centimeters, and a thickness dimension of 0.4 centimeter. The width of the lithium diffused N-type zone 19, intrinsic zone 24 and gallium doped germanium P-type zone 17 were respectively 0.5 millimeter, 1 centimeter and 0.3 centimeter. The capacitance of the solid state radiation detector measured 1.9 picofarads. To provide means of making an electrical connection to N-type zone 17, its surface 18 was masked with a thin 50 percent indium–50 percent gallium alloy film as painting the liquid alloy thereon.

In use, the above specifically described solid state radiation detector was mounted so that the radiation under observation impinged upon the 3.9 square centimeter surface 16. As is shown in FIGURE 1, the radiation incident surface 16 is devoid of any material capable of preattenuating incident radiation. In the prior art type detectors, as customarily employed, the radiation is caused to penetrate to the depletion zone 24 along a path through film 26 and zone 17. Although electron-hole pair production occurred in film 26 and zone 17, the electric field gradient is so low in those regions that the generated electrons and holes do not contribute to the net current flow. Hence, in effect the energy or intensity level of the radiation is attenuated resulting in the current representation of the energy or intensity level of the radiation being inaccurate. However, by arranging for the radiation to impinge on the detector body 11 along a path which transversely intersects the lithium drift path, the energy and intensity level of the incident radiation is not preattenuated. This is particularly important in those cases where the detector is employed to observe radiation of low penetrating power, such as, beta radiation and other particle radiation as well as very low energy X-rays.

As noted supra, the capacitance of the radiation detector measured 1.9 picofarads. This low capacitance is mainly attributed to reduction in the area of surface 18. (Corresponds to area A in equation noted hereinbefore.) With reference to FIGURE 2 it is seen that a radiation detector constructed in accordance with the teachings of the prior art having a radiation incident surface corresponding to surface 16 of the detector of the present invention, i.e., approximately 3.0 square centimeters, the capacitance of the prior art detector will be at least two and one half times greater than the detector of the present invention, i.e., 5.0 picofarads with a resolution at least twenty percent poorer. The resolution full pulse width half maximum pulse height for the radiation detector of the present invention with a given amplifier at various gamma energy levels was found to be 1.9 kev. and 4.1 kev. for 122 kev. $Co^{57}$ source and 1.333 mev. $Co^{60}$ gamma respectively.

The solid state radiation detector of the present invention is fabricated by employing essentially standard techniques. For example, a lithium drifted germanium detector as noted supra is constructed by cutting a rectangular cubical body 11 from a gallium doped low-oxygen content germanium semiconductor ingot having a resistivity in the range of 35–45 ohm centimeters. The cutting is accomplished with a diamond saw. The surfaces of the semiconductor body 11 are cleaned and surface roughness is removed by lapping with a suitable lapping material, e.g., 1900 grit silicon carbide. The lapping material is removed from the surface of body 11 by cleaning and washing it with deionized water. For the remainder of the fabrication process, contacting of the body 11 with metal should be avoided. Handling of the semiconductor body 11 is to be accomplished with Teflon® and plastic tools and under clean conditions.

After the wash is completed, the PN junction is formed by vacuum depositing lithium onto surface 18 and diffusing the lithium into body 11 to a depth, e.g., of 0.5 millimeter to form N-type zone 17. The vacuum deposition is carried on at $10^{-5}$ millimeters of mercury at 600° C., and the diffusion process at 450° C. for five minutes. The diffused junction semiconductor body 11 is then etched for two minutes in a solution of three parts $HNO_3$ and one part HF. The etching removes lapping damage from the sides defined by the width 13 and thickness 14 dimensions to thereby eliminate surface current paths.

In some cases it may be desirable to prepare more than one radiation detector at a time. In those cases, a large body has lithium diffused therein. Subsequent to the drifting step the individual detectors are cut from the large body and cleaned and etched in the manner noted supra.

The intrinsic zone 24 is prepared by drifting the lithium diffused semiconductor body 11. The size of the zone 24 depends upon the length of time that the drifting is carried on. To drift a one centimeter wide zone 24, lithium diffused body 11 is maintained at approximately 35° C. with a reverse bias applied between surfaces 18 and 21 for about three weeks. Upon completion of the drifting, the body 11 is etched for 30 seconds in the bath noted supra, and then rinsed with methyl alcohol. This etching and washing removes any contamination that might have collected on the surface during the drifting process. Finally, the surface states are set by submerging the body 11 for a period of five to twenty seconds in a 30% solution of $H_2O_2$, and then rinsing again in methyl alcohol.

Now, with particular reference to FIGURE 3, the gallium doped lithium drifted germanium radiation detector of FIGURE 1 is shown in its preferred environment for detecting radiation. To reduce leakage current body 11 is mounted within an evacuated chamber 31 in thermal conducting relation to a liquid nitrogen cold sink 32. The cold sink 32 communicated via a suitable conduit 33 to a liquid nitrogen source (not shown). The interior region defined by chamber 31 is evacuated to $5 \times 10^{-5}$ millimeters of mercury by a suitable vacuum pump (not shown), e.g., a diffusion vacuum pump, communicated to the interior via port 34.

Body 11 is mounted within chamber 31 by a copper mounting bar 36 defining a slotted end portion 37 for receiving in electrical conducting relation the P-type zone 19 portion of body 11. The body 11 is mounted so that surface 16 of maximum area faces a radiation permeable beryllium window 38 hermetically mounted in a wall of chamber 31. The end of mounting bar 36 distal body 11 is fastened in thermal conducting relation to a copper plate 39 which is maintained at the liquid nitrogen temperature of 77° K.

The electrical circuit connection is provided to semiconductor body 11. P-type zone 19 by grounding copper bar 36. The N-type zone 17 is electrically connected through indium-gallium film 26 to electrical conductor 41. Conductor 41 hermetically penetrates to the exterior of chamber 31 through a suitable seal 42. Radiation from a source 43 positioned in line of sight alignment with detector surface 16 and window 38 impinges on semiconductor body 11 and generates a current representative of the energy and intensity level of the radiation from source 43.

Figure 4:
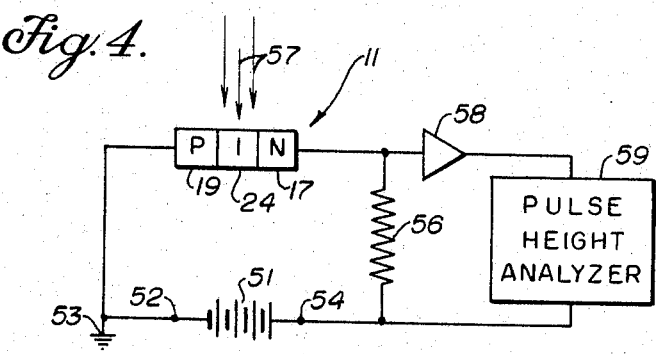
FIGURE 4 is a schematic drawing including a circuit diagram illustrating a radiation detection system employing the solid state detector of the present invention.

A description of the solid state radiation detector of the present invention used to analyze two nuclear decay schemes will be made with reference to FIGURE 4. The radiation detector is that particular semiconductor body 11 described in detail above. The body 11 is a 3 x 1.3 x 0.4 centimeter gallium doped lithium drifted germanium semiconductor material. The semiconductor body 11 is reversed bias for operation by a D.C. (direct current) bias voltage supply 51. A negative terminal 52 of supply 51 is connected to the lithium rich zone 19 of body 11 through ground 53. A positive terminal 54 of supply 51 is connected through a resistive load to the gallium doped charged germanium zone 17 of body 11. The supply 51 is adjusted to deliver 1000 volts across the PN junction zone 24 of body 11.

To analyze the semiconductor body current representation of radiation 57 impinging thereon, a conventional low noise, charge sensitive preamplifier 58 is electrically connected to detect and amplify with low noise the current variation through load 56. The output of preamplifier 58 is electrically coupled to the input of a conventional pulse height analyzing means 59. If the entire spectrum of a nuclear decay scheme is to be analyzed a multichannel pulse height analyzer 59 would be employed. On the other hand if a particular radioactive transformation is to be viewed, an appropriately biased amplifier could be used as a single channel pulse height analyzer to determine the voltage level of the pulse representative of the energy of the incident particle or gamma radiation.

The first nuclear decay scheme analyzed was the decay of $Cs^{137}$ to $Ba^{137}$. The transformation takes place by the emission of beta radiation and gamma radiation. The principal beta emission was observed at 624.2 kev. (kiloelectron volts) K-conversion line. A 656.6 kev. L-conversion line beta emission of approximately one quarter the intensity of the principal emission also was observed. The emitted gamma radiation was found at 661.6 kev.; the counts thereof were determined.

The second nuclear decay scheme analyzed was the decay of $Bi^{207}$ to $Pb^{207}$. This transformation also takes place by the emission of beta and gamma radiation. The beta emission was observed to be 976 kev. K-conversion line, a 1.04814 mev. L-conversion line, and a 1.06015 mev. M-conversion line. An intense gamma radiation was found to be present at 1.064 mev. (million electron volts) for which the counts were determined.

Although the present solid state radiation detector was described as it was used in the analysis of a nuclear decay scheme, it is readily adaptable to many other applications. For example, the detector may be used to identify isotopes such as radio isotope fission fragments produced by neutron bombardment of enriched uranium. Also the radiation detection of the present invention may be used with NaI crystal to detect and analyze gamma, X-ray coincidences.

While the solid state radiation detector of the present invention has been hereinbefore described in particular detail with respect to a rectangular cubical embodiment, it will be apparent that numerous modifications and variations are possible within the scope of the invention. For example, the geometric configuration of the detector may take various solid forms, such as a long cylindrical, a solid having a trapezoidal cross section, or any multiple surface body defining angularly related surfaces of at least one large area relative to at least one second surface of lesser area. In any of the various possible geometrical configurations, the only necessary limitations are that the radiation be incident on the surface of larger area and that the reverse bias voltage be applied across surfaces of lesser area than and angularly disposed to said larger area surface.

Hence, the description of the present invention with respect to the embodiment shown in the accompanying figures is not intended to limit the invention except by the terms of the appended claims.

What is claimed is:
1. A solid state radiation detector element comprising: an elongated wafer of semiconductor material defining an incident radiation surface of maximum area and minimum surface areas transversely intersecting said surface of maximum area including;
    (1) a positively doped semiconductor zone extending into said wafer from a first surface of minimum area,
    (2) a negatively doped semiconductor zone extending into said wafer from a second surface of minimum area opposite said first surface, and
    (3) an intrinsic semiconductor zone of selected width conductively interposed said positively and negatively doped zones.
2. The radiation detector recited in claim 1 further defined by said elongated crystal being of a rectangular cubical configuration.
3. A solid state radiation detector element comprising,
    (a) a rectangular germanium semiconductor crystal wafer doped with an impurity of a positive polarity, said crystal wafer defining an incident radiation surface of maximum area and surfaces of minimum area perpendicularly intersecting said surface of maximum area,
    (b) an impurity of negative polarity diffused into one of said surfaces of minimum area to form a PN junction transversely intersecting said incident radiation surface of maximum area,
    (c) a conductive film disposed in masking conducting relation to the surface of minimum area proximate said PN junction, and
    (d) terminal means attached to said conductive film and opposite surface of said crystal for receiving a reverse bias voltage thereacross, such that said negative polarity impurity is drifted away from said film to form and define an intrinsic semiconductor zone separating said positive and negative polarity impurities.
4. A radiation detector as recited in claim 3 further defined by,
    (a) said germanium semiconductor being doped with gallium,
    (b) said impurity of negative polarity being lithium, and
    (c) said film being an alloy of 50 percent indium and 50 percent gallium.

5. The radiation detector as recited in claim 3 further defined by
 (a) said maximum surface area is at least three times as great as the area of one of said minimum surfaces;
 (b) the magnitude of said bias voltage adjusted to extend said intrinsic zone substantially throughout the semiconductor zone between said minimum area surfaces, said intrinsic zone further extending at least .75 cm. between said minimum area surfaces; and
 (c) a second conductive film disposed in masking conducting relation to the surface of the minimum area distal said PN junction.

6. A solid state radiation detector characterized by being responsive to both beta particle and gamma radiation, the combination comprising:
 (a) a rectangular cubical gallium doped germanium semiconductor crystal having a resistivity of approximately 40 ohm-centimeters and dimensions of 3.0 centimeters long, 0.4 centimeter thick and 1.35 centimeters wide including,
  (1) a lithium doped zone extending into said crystal to a depth of 0.5 millimeter from a surface thereof defined by the 3.0 and 0.4 centimeter dimension to define an interior boundary,
  (2) an intrinsic zone extending from said interior boundary of said lithium doped zone into said crystal to a depth of 1.0 centimeter to define an interior boundary of a gallium doped semiconductor zone approximately 0.3 centimeter deep relative to a surface of said crystal defined by the 3.0 and 0.4 centimeter dimension opposite said surface proximate said lithium doped zone,
 (b) an alloy of 50 percent indium and 50 percent gallium film disposed in masking conducting relation to said surface proximate said lithium doped zone, and
 (c) a reverse bias voltage source providing of the order of 1000 volts electrically connected between said film and said gallium doped semiconductor zone.

References Cited

UNITED STATES PATENTS

| | | | |
|---|---|---|---|
| 2,988,639 | 6/1961 | Welker et al. | 250—83.3 X |
| 3,205,357 | 9/1965 | Lindsay | 250—83.3 |
| 3,212,940 | 10/1965 | Blankenship | 250—83.3 X |
| 3,225,198 | 12/1965 | Mayer | 250—83.3 |

ARCHIE R. BORCHELT, *Primary Examiner.*